(12) United States Patent
Spencer et al.

(10) Patent No.: US 8,503,448 B2
(45) Date of Patent: Aug. 6, 2013

(54) COMMUNICATIONS SYSTEM

(75) Inventors: Jonathan Allan Spencer, Portsmouth (GB); Giles David Kendrick, Portsmouth (GB); Jonathan Paul Millington, Portsmouth (GB); Ian David Stephenson, Portsmouth (GB); Philip James Entwisle, Portsmouth (GB)

(73) Assignee: Qinetiq Limited (GB)

( * ) Notice: Subject to any disclaimer, the term of this patent is extended or adjusted under 35 U.S.C. 154(b) by 647 days.

(21) Appl. No.: 12/665,980

(22) PCT Filed: Jun. 19, 2008

(86) PCT No.: PCT/GB2008/002094
§ 371 (c)(1),
(2), (4) Date: Dec. 22, 2009

(87) PCT Pub. No.: WO2009/001041
PCT Pub. Date: Dec. 31, 2008

(65) Prior Publication Data
US 2010/0172350 A1 Jul. 8, 2010

(30) Foreign Application Priority Data
Jun. 23, 2007 (GB) .................................. 0712221.1

(51) Int. Cl.
*H04L 12/28* (2006.01)
(52) U.S. Cl.
USPC ......................................................... 370/390
(58) Field of Classification Search
None
See application file for complete search history.

(56) References Cited

U.S. PATENT DOCUMENTS

| 5,412,654 | A | 5/1995 | Perkins |
| 7,099,323 | B1 | 8/2006 | Doong et al. |
| 2005/0078689 | A1* | 4/2005 | Sharma et al. ................ 370/401 |
| 2008/0064391 | A1* | 3/2008 | Cai et al. .................... 455/426.1 |

(Continued)

FOREIGN PATENT DOCUMENTS

| WO | WO02/21770 | 3/2002 |
| WO | WO2004/051939 | 6/2004 |

OTHER PUBLICATIONS

Perkins et al., "Highly Dynamic Destination-Sequenced Distance-Vector Routing (DSDV) for Mobile Computers", Computer Communication Review, vol. 24, No. 4, Oct. 1994, pp. 234-244.

(Continued)

*Primary Examiner* — Andrew Lai
*Assistant Examiner* — Leon Andrews
(74) *Attorney, Agent, or Firm* — McDonnell Boehnen Hulbert & Berghoff LLP

(57) ABSTRACT

A Communications system for communicating over low bandwidth or high latency links incorporates a router MR7 configured to route a message to any like-configured router MR8, MR9 linked to it. Communications are implemented at network layer with UDP IP message packets. There are no hello messages. The message format 20 includes routing information but not designated and backup routers, which avoids loss of service from designated router changes and reduces bandwidth requirements. Configured routers MR7 to MR9 have different message formats 20, 40 for communicating with configured routers MR7 to MR9 and with unconfigured routers R1 to R6 respectively, and can link different protocols. A configured router MR7 deletes routes to like-configured routers MR8, MR9 with route metrics not superior to other routes with like destination. It also deletes routes with inferior metrics to related routes in an incoming message, and retains received route information regarding a new route or a route with superior metric. Some routes are not advertised, e.g. loop-back routes, multicast or broadcast routes, experimental destinations, unconfigured or zero-configured addresses, and routes matching a summary route and any user configured routes/networks.

15 Claims, 9 Drawing Sheets

U.S. PATENT DOCUMENTS

2010/0172350 A1* 7/2010 Spencer et al. ............... 370/390

OTHER PUBLICATIONS

Holter et al., "Design and Implementation of Wireless OSPF for Mobile Ad Hoc Networks", retrieved on Oct. 17, 2007 from http://folk.uio.no/paalee/referencing_publications/ref-xa-holter-adhoc06.pdf. Last modified Nov. 29, 2006.

Routing Information Protocol (RIP), retrieved Oct. 17, 2007 from http://www.inetdaemon.com/tutorials/internet/ip/routing/rip/index.shtml.

* cited by examiner

COMMUNICATIONS SYSTEM

BACKGROUND OF THE INVENTION (1) Field of the Invention

This invention relates to a communications system and a method for communicating, and more particularly (although not exclusively) to a system and method of the kind which can operate over network links referred to as limited links and characterised by low bandwidth or high latency or both.

(2) Description of the Art

Communications systems operating over multiple network links are required to select routes to allow transmission and reception of messages in communications with other systems. These links include satellite links and Integrated Services Digital Network (ISDN). For message routing purposes, a communications system incorporates a control computer referred to as a router. A router is used to control routing of messages between communications systems by matching the destination of a message against a routing table which it maintains by exchanging routing messages with neighbouring routers to update the table. The method of transmission uses protocols referred to as Transmission Control Protocol (TCP) and Internet Protocol (IP) which together form the TCP/IP suite. For routing purposes, a router may be considered to be synonymous with the communications system of which it is a part.

Communications protocols are conceptually built up in layers or levels defined by software, with services offered by one (lower) layer being used by a subsequent layer above it to implement a richer protocol. A layer model known as the OSI 7-layer model consists of the following:

7. Application Layer—Network process to application;
6. Presentation Layer—Data representation and encryption;
5. Session Layer—Interhost communication;
4. Transport Layer—End-to-End connectivity (TCP);
3. Network Layer—Path determination (IP);
2. Data Link Layer or Link Layer—Physical addressing; and
1. Physical Layer—media, signal and binary transmission.

The above seven layers may be treated as merged in groups to form three layers: i.e. layers 7, 6 and 5 may be treated as a combined application layer, layers 3 and 4 as a network layer, and layers 1 and 2 as a link layer.

Message packet sending may be unicast, multicast or broadcast: unicast means sending a packet to an individual IP address; multicast means sending a packet to a group or plurality of addresses, i.e. to some but not to all communications systems connected to a network; broadcast means sending a packet to a broadcast address of a network, so that all communications systems connected to the network receive the packet.

Communications message traffic may be routed over wireless links by routers using computer software referred to as OSPF which implements a known algorithm called "Open Shortest Path First". Other examples of routing software are also known, called BGP and RIP. An open source implementation of such routing software is called "Quagga Routing Suite" or "Quagga". Quagga contains executable implementations of OSPF, BGP and RIP routing software with a controlling system called Zebra, each of which runs as a daemon, i.e. in the background with no user interaction required.

U.S. Pat. No. 5,412,654 discloses a data communications system which operates at the data link layer or link layer. It selects routes on the basis of the fewest number of hops to a destination, a hop being defined as communication between an adjacent pair of communications systems linked by a communications path having no other intervening communications system in it. This means that a hop involving a high-speed, reliable link is treated as equivalent to a less reliable limited link with low bandwidth and/or high latency, whereas two hops over high-speed reliable links may be preferable to one hop over a slow limited link. U.S. Pat. No. 5,412,654 also discloses use of broadcast packet sending, which is not useful over Point-to-Point Protocol links, therefore it requires both ends of a communication route of one or more hops to be within the same network. There is no straightforward way to link directly two communications systems using different protocols both operating at the Link Layer.

RIP routing software uses unicast packet sending, so a packet is sent to an individual remote communications system. Consequently a packet to be received by multiple remote communications systems is required to be sent out of a communications interface as many times as there are intended recipients. Like U.S. Pat. No. 5,412,654, RIP uses fewest number of hops as a basis for selecting best routes and treats all types of links as equivalent, whether limited or not. RIP also provides for a routing table to be requested periodically.

A router which implements OSPF may be referred to as an OSPF router. OSPF is widely supported by commercial-off-the-shelf (COTS) equipment. OSPF (version 2) is the modern interior gateway dynamic routing protocol of choice for IP routing, and is a de facto standard for IP routing via fixed links: here "interior" means a routing protocol which works within an autonomous system, i.e. a group of IP communications system or routers in an area considered as an entity; the converse of interior, i.e. exterior, means a routing protocol which works between different autonomous systems; gateway means a router which serves as an entrance to or exit from an interior network, i.e. it is on the borders of two autonomous systems; "dynamic" means that routing is not fixed but can vary and a fixed link is a link (e.g. a hard wired link) which does not change with environment (e.g. weather affecting a wireless link). A router maintains and updates a table of information (routing table) listing addressing details of other routers linked in a communications network and available for receiving message traffic: addressing details of routers may be added to or deleted from a routing table as they become or cease to be available for communication. If there is good connectivity over network links between routers then OSPF traffic will keep routing tables up to date.

In setting up routing of message traffic between OSPF routers in a communications network, two of the routers are automatically elected to be in charge of distributing topology information on a link by link basis regarding the routers linked together in the network: i.e. individual links are between respective pairs of routers. The elected routers are referred to as the designated router (DR) and the backup designated router (BDR). All routers exchange their routing information with the two elected routers, which then disseminate it to the other adjacent routers in the area: here two routers are "adjacent" to one another if they are connected via a single link so that a message can pass between them in a single hop. This is an optimisation built into the OSPF protocol: it substantially reduces the amount of routing message traffic necessary when compared to a full-mesh equivalent, i.e. every router exchanging information with every other router. OSPF is designed with high-speed, reliable link-layers in mind, notably Ethernet. It is, however, a large and complex protocol and places significant demands on the fixed link layers it traverses.

OSPF Supports:
  (a) dynamic discovery of peers using multicast messages: a peer is another communications system with which linking might be required, represented by its router, and a multicast message is a message with unrestricted recipients;
  (b) dividing large networks into smaller "areas" of routers: an area is connected to another area in the large network via a "backbone" area;
  (c) link state routing with all routers in an area being informed: here link state means availability of links—routers need information on which links can be used for message traffic;
  (d) aggregation of routes into summaries at area or subnet borders: aggregation relates to routes sharing a common link, i.e. one router being used as a stepping stone to other routers in an area so that multiple destinations in an area can be reached via a single link (e.g. a backbone) to a router;
  (e) rapid convergence via the OSPF shortest path algorithm: convergence means establishment of consistent routing tables between adjacent routers;
  (f) assignment of arbitrary route metrics to links unidirectionally, i.e. for a single pass along a link: a route metric is a number assigned to a link and expressing the desirability or otherwise of using the link;
  (g) well-defined interfaces with exterior routing algorithms, so that for example different autonomous systems can be connected together and an intranet can communicate with external networks such as the internet;
  (h) classless routing with variable length subnet masks: here class relates to one of three historical classes of network size;
  (i) election of designated routers to reduce traffic on a shared subnet; and
  (j) robust (i.e. fault tolerant) operation when data packets are lost from a message;

However, OSPF functions less well with communications links of the kind referred to herein as "limited links" and defined as having low-bandwidth or high latency or both: e.g. a link with a bandwidth in the range of 2 Kbits/s (typical of HF radio) to 40Kbits/s (typical of the UHF SNR system) is a low-bandwidth link; and a link for which the time taken for a message to be sent and a response received (round trip time) exceeds 2 seconds is a high latency link.

Routing instability can result from the designated router election protocol in OSPF because of intermittent connectivity, i.e. when routers join or leave a network and consequently network links not being constant. A router will join (become a new member of) the network by sending a message referred to as a 'hello' message. The hello message needs to be acknowledged in handshaking fashion before the new member can join the network, which consumes available bandwidth and can be a problem for a limited link. The sudden appearance of a 'hello' message can cause the new member to be elected as the designated router (DR) or the backup designated router (BDR). Upon such an election, existing OSPF peerings (pairings between the previous DR, BDR and adjacent routers) on the network are dropped, and new adjacencies are formed between the newly elected DR and/or BDR and other network routers by exchanging routing databases or tables: the exchange causes a temporary routing interruption. If the new member of the network, i.e. the newly elected DR or BDR, has poor (e.g. intermittent) connectivity to the rest of the network, this can cause a total loss of service which will partition the network and may take several minutes to resolve. It will interrupt connectivity between all members of the network, even those with good connectivity to members other than the new member.

Serious challenges for the useful operation of OSPF are posed by a network which uses limited links, i.e. low bandwidth and/or high latency links as aforesaid: this also applies to any situation where TCP/IP message traffic does not perform as expected. Across a limited link OSPF can take a very long time to synchronise, i.e. to produce consistent routing tables between neighbouring routers. The number of message send-receive round-trips required to establish a link coupled with high latencies and relatively small time-out values built into the OSPF protocol tend to cause delays in setting up a network and instability once the network is formed: here a time-out value is a predetermined time delay during which a message is awaited but not received. Over a limited link, the handshaking hello procedure in the OSPF protocol employed to establish network links either fails or requires an excessive number of retries caused by message packets being lost or seriously delayed. Long delays in synchronisation and long-term instability are serious failings: they result in a communications service which is in theory up and running with capacity available, but which is not actually available to users for sending message traffic in a timely manner.

SUMMARY OF THE INVENTION

It is an object of the present invention to provide an alternative communications system.

The present invention provides a communications system for communicating over limited links, the system being arranged to implement communications at network layer and incorporating a configured router which:
a) is configured to route a message without a handshaking hello routine to any like-configured router connected to any link over which the message passes, and
b) has a message format which includes routing information but not a designated router or a backup designated router.

The invention provides the advantage that, unlike conventional OSPF, there is no designated router or backup designated router to cause loss of service between configured routers implementing the invention. Moreover, the invention does not use hello messages. Messages are received by any configured routers connected to a link over which the message passes. Consequently, unlike OSPF once more, the invention does not use a handshaking routine involving exchange of hello messages to enable a router to become a new member of a network. This also results in lower bandwidth requirements for the invention compared to OSPF, an important consideration for a low bandwidth, high latency link.

Moreover, because the invention implements communications at network layer, it provides the advantage that it can link (or bridge between) two different protocols. Consequently the invention can be used to build up an IP network of communications systems operating with different protocols, unlike prior art communications systems implementing communications at link layer.

In a preferred embodiment, the configured router is arranged to:
a) send and receive multicast communications consisting of user datagram protocol (UDP) IP packets,
b) maintain respective route metrics for hops in a network over which the communications system operates, and
c) derive a preferred communications route to a message recipient as that having hops with hop metrics summing to a total which is superior to that or those associated with a comparison route or routes to that recipient.

This embodiment enables communications routes with hops over high-speed, reliable links to be preferred to those with hops over less reliable limited links with low bandwidth and/or high latency.

The message format may be a first message format, and the configured router may also be arranged to implement a second message format providing handshaking hello information, a designated router and a backup designated router for communication with unconfigured routers arranged to implement the second message format also. The second message format may be an OSPF message format, but this is not essential as the invention is applicable to other second message formats.

The configured router may be arranged to preserve route metric information received from a sending unconfigured router for onward transfer to a receiving unconfigured router. It may maintain a local routing table containing route information relating to like-configured routers and unconfigured routers, and be arranged to implement a maintain routing table procedure in which routes to like-configured routers are deleted from the local routing table if they have route metrics which are not superior to those of routes of like destination associated with unconfigured routers.

The configured router may be arranged to implement a send message procedure comprising running the maintain routing table procedure to generate an up-to-date routing table for a routing message and then sending the routing message to communications interfaces leading to like-configured routers. It may be arranged to exclude from advertising of any one or more of routes to an interface of the configured router itself, multicast routes, broadcast routes, experimental destinations not in normal use, loop-back routes, unconfigured addresses, zero-configured addresses and routes that match a summary route. It may also be arranged to maintain a local routing table containing route information relating to like-configured routers, and be arranged to implement a receive message procedure in which routes with inferior route metrics to related routes in an incoming message are deleted from the local routing table, and route information in a received message is inserted into the local routing table if it relates to a route which is either not already in the local routing table or if it has a superior route metric compared to that of a route which is already in the local routing table.

In another aspect, the present invention provides a method for communicating over limited links, the method incorporating communicating at network layer and using a configured router to route a message without a handshaking hello routine to any like-configured router connected to any link over which the message passes, the message having a message format which includes routing information but not a designated router or a backup designated router.

In a further aspect, the present invention provides a computer software product comprising a computer readable medium encoded with computer readable instructions for use in implementing communications over limited links at network layer, the instructions being for controlling a configured router to route a message without a handshaking hello routine to any like-configured router connected to any link over which the message passes, the message having a message format which includes routing information but not a designated router or a backup designated router.

Mutatis mutandis, the method and computer readable medium aspects of the invention provide like advantages compared to the communications system aspect, and have equivalent preferred features which are optional rather than essential.

DESCRIPTION OF THE DRAWINGS

In order that the invention might be more fully understood, an embodiment thereof will now be described, by way of example only, with reference to the accompanying drawings, in which:—

DESCRIPTION OF THE INVENTION

Figure 1:
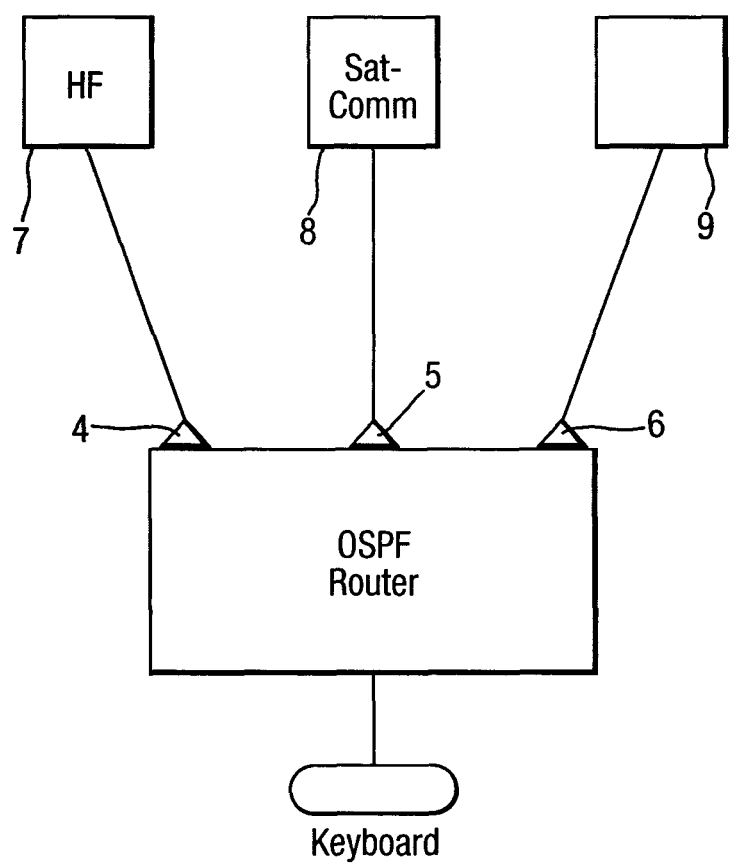
FIG. 1 is a schematic block diagram drawing of a prior art router-controlled communications system.

Referring to FIG. 1, a prior art router-controlled communications system 1 incorporates a router 1 in the form of a computer controlled by a keyboard 2. The router 1 has interfaces 4, 5 and 6 to three different types of communications apparatus, high frequency (HF) 7, satellite communications 8 and other types indicated collectively by 9. Message routing via the communications apparatus 7 to 9 is controlled by the router 1.

Figure 2:
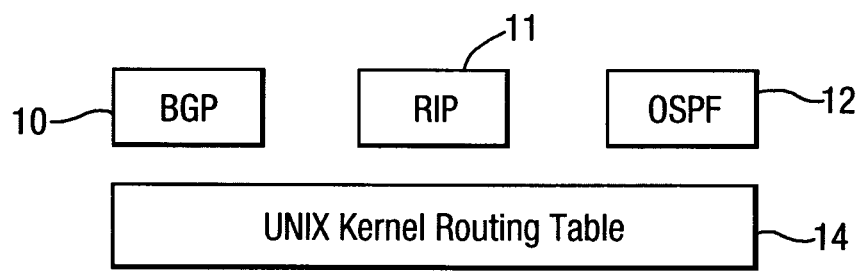
FIG. 2 is a block diagram of software installed on a prior art or conventional OSPF router.

FIG. 2 shows software installed on conventional OSPF routers using a UNIX operating system, the software being BGP 10, RIP 11 and OSPF 12. This software is used for maintaining and updating route information in a local routing table held in a UNIX Kernel 14. The invention is not however restricted to a UNIX operating system: Windows may be used for example.

Figure 3:
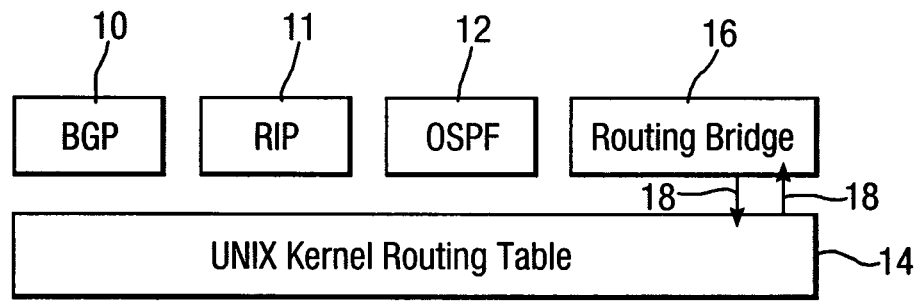
FIG. 3 is a block diagram of software installed on a modified OSPF router which is configured by the software to implement the invention.

FIG. 3 shows software installed on a modified OSPF router which is configured by the software to implement the invention. This router also uses a UNIX operating system. Parts equivalent to those described earlier are like-referenced. A modified OSPF router also has BGP 10, RIP 11 and OSPF 12, and uses OSPF to communicate with conventional OSPF routers. However, the modified OSPF router has been modified to implement the invention by also running computer software 16 referred to herein as "Routing Bridge": as indicated by arrows 18, it is the Routing Bridge software 16 which controls maintenance and updating of route information to other modified OSPF routers in a local routing table held in the UNIX Kernel 14.

The Routing Bridge sends and receives multicast communications which consist of user datagram protocol (UDP) IP packets; UDP operates over the network layer of the OSI 7-Layer model, and consequently so also does the Routing Bridge. It utilises UNIX commands to put packed data into a UDP packet ready for transmitting: here packed data consists of routes which can be advertised from a sender.

Figure 4:
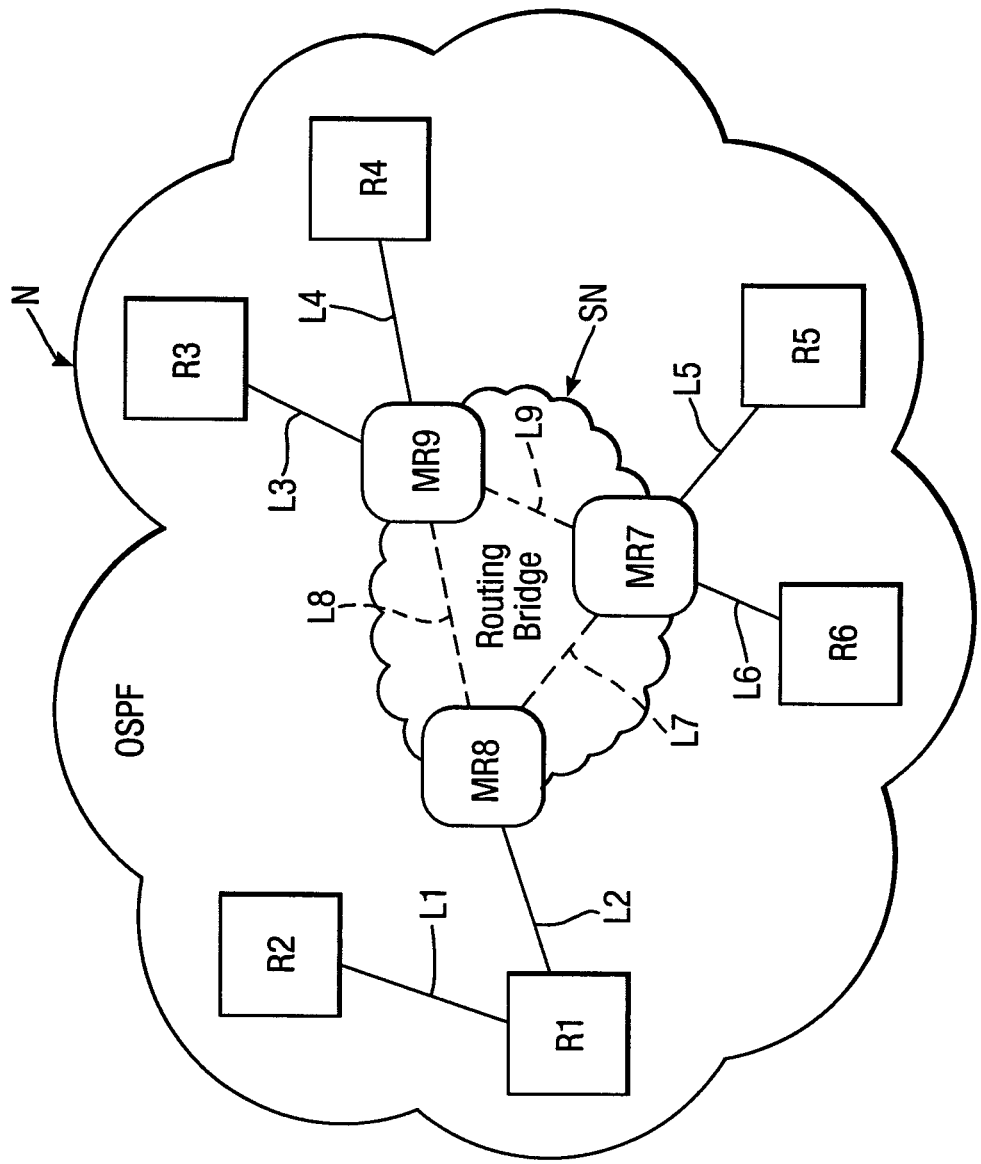
FIG. 4 is a schematic drawing of a communications network of conventional (unconfigured) OSPF routers and modified OSPF routers implementing the invention.

Referring to FIG. 4, nine wireless communications systems represented by their respective routers R1 to R6 and MR7 to MR9 are connected together by links L1 to L9 between neighbouring or adjacent routers to form a communications network indicated generally by N. These routers are arranged in an outer group of six routers R1 to R6, and a central group of three routers MR7 to MR9 forming a subnet SN with limited links (low bandwidth and/or high latency) L7 to L9. The outer group consists of conventional OSPF routers R1 to R6, but the central group consists of modified OSPF routers MR7 to MR9 running Routing Bridge software. All nine routers R1 to MR9 run conventional software, i.e. a UNIX Kernel operating system and OSPF, but routers MR7 to MR9 in the central subnet SN also have Routing Bridge software communicating with the UNIX Kernel. The Routing Bridge software operates in a lightweight manner: i.e. it reduces the amount of routing information sent in message traffic compared to conventional OSPF.

The routers R1 to R6 and MR7 to MR9 use routing protocols to exchange routing information with one another over respective links L1 to L9 between neighbours. If there is good connectivity between these routers, then unmodified OSPF message traffic can be sent to keep routing tables up-to-date. However, if there is poor connectivity between these routers, i.e. because the central subnet links L7 to L9 are limited links, then the Routing Bridge software is used to relay OSPF information between routers.

The Routing Bridge Software Enables:
(a) linking of modified OSPF routers to conventional OSPF routers in a single network—i.e. modified OSPF routers are capable of linking with conventional OSPF routers;
(b) modified OSPF routers to use OSPF when communicating with conventional OSPF routers but to use Routing Bridge software when communicating with modified OSPF routers;
(c) seamless support for multiple communications systems each running Routing Bridge software and in a network, and/or for multiple Routing Bridge software applications operating independently on the same modified router;
(d) OSPF metric information received from a conventional OSPF router to be relayed by modified OSPF routers to other conventional OSPF routers as appropriate; e.g. in FIG. 4, OSPF metric information received by central group router MR8 from outer group router R1 via link L2 is relayable via central subnet router MR9 to outer group router R4 via links L8 and L4. This is to enable conventional OSPF routers R1 to R6 to determine optimal routing paths correctly; and
(e) robustness against packet loss from message traffic and transient losses of network connectivity via links L1 to L9.

A router has the important function of selecting the best route to another router. In conventional OSPF routing, each network link or hop has a numerical OSPF cost figure assigned to it, and a router calculates the best route as that having the lowest OSPF cost expressed as a sum of costs of the route's constituent hops. The equivalent of an OSPF cost for the Routing Bridge is referred to herein as a route metric. A network may have multiple Routing Bridge software applications running on the same router or on different routers, and there may be two routers linked by an alternative route that avoids each of the Routing Bridges: in these circumstances, routers must be able to calculate a best route through the network as if the network consisted entirely of conventional OSPF routers instead of consisting partially of conventional OSPF routers and partially of modified OSPF routers. To achieve this, modified OSPF routers advertise downstream route metrics, which correspond to links L1 to L6 outside the central subnet SN in FIG. 4: they also add on an appropriate extra route metric for crossing a link between modified OSPF routers, e.g. link L7, L8 or L9 as appropriate in the central subnet SN. The downstream route metrics are then re-injected into message traffic passing to conventional OSPF routers, e.g. in FIG. 4, routers R1 to R6 in regions of the network N outside the central subnet SN: this forms a seamless routing domain. Transportation of route metrics across a subnet SN of modified OSPF routers in a network also containing conventional OSPF routers ensures that correct routing decisions can be made.

Routing information must be made available to routers R1 to MR9 in the network N, and the routes in the UNIX Kernel table of one of these routers might be from multiple sources, such as:
(a) networks directly connected to an Routing Bridge network of modified OSPF routers such as the central subnet SN,
(b) destinations learned across links to conventional OSPF routers R1 to R6, and
(c) routes learned from one or more Routing Bridge networks.

The Routing Bridge implements what is referred to in the art as split-horizon routing to avoid formation of a closed loop of links around which a message circulates without reaching an intended destination outside the loop. Routes which are directed out and back across the same link are not advertised by modified OSPF routers in messages sent containing route information. An example of a looped route can be seen at http://en.wikipedia.org/wiki/Split_Horizon.

A modified OSPF router maintains its local routing table using routing information in routing messages it receives from sending peers. On receiving a routing message, a modified OSPF router installs in its local routing table new routes currently not in the table or better routes than those already there and obtained from the message in each case. The "next hop" parameter for insertion in the routing message is set to be that of the sending peer from which the message was received, and the route metric set to be the sum of the route metric received from the sending peer and the route metric for crossing the limited link L7, L8 or L9: here a hop is passage of a message over a single link connecting two adjacent or neighbouring routers in a network: here two routers are adjacent or neighbouring if they are directly linked to one another via a single hop, i.e. there is no other router in a route linking them.

Figure 5:
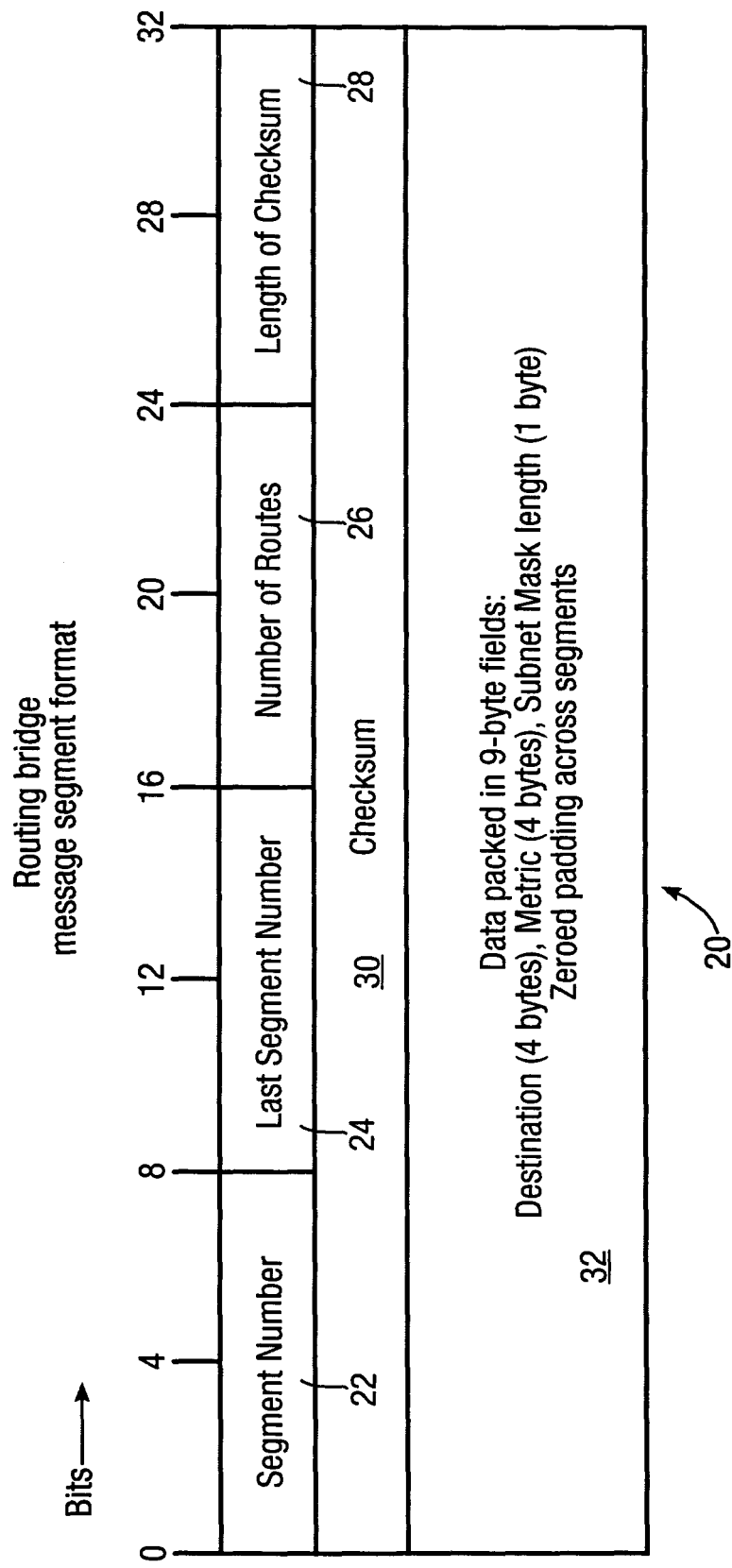
FIG. 5 shows a first message format for a message segment header used in an embodiment of the invention.

The Routing Bridge has a message segment header format 20 shown in FIG. 5. Message segments sent by modified OSPF routers encapsulate a header and a packed form of the routing table in one or more user datagram protocol (UDP) packets. Messages are segmented into multiple UDP packets under the control of a Maximum Transmission Unit (MTU): this is performed by the Routing Bridge software, which also reassembles the segments into a message when received at a destination router. Each segment begins with a 32-bit aligned header indicated by a scale at the top of the drawing and consisting of six fields 22 to 32 as follows.
(a) Segment Number 22 (8 bits): identifies the segment position in the message;
(b) Last Segment Number 24 (8 bits): the segment number of the final segment of the message;
(c) Number of Routes 26 (8 bits): the number of routes in the entire message;
(d) Length of Checksum 28 (8 bits): the number of 32-bit words in the checksum;

(e) Checksum 30 (32 bits): arbitrary checksum field, computed across all segments of a message: the checksum is calculated by summing the digital information in the message and provides a check that information has not been lost from the message or become corrupted in transit; and (f) Destination data 32 in 9 byte fields (72 bits), i.e. destination (4 bytes), route metric (4 bytes) and Subnet mask length (1 byte): total 72N bits, where N is the number of routes (maximum value of N is 162 per message segment).

The routes in the message are packed into 9-byte data fields at 22: the route data fields are destination (4 bytes); route metric (4 bytes); subnet mask length (1 byte): here the destination specifies a route to a destination router, the route metric the cost of that route, and the subnet mask defines the size of the subnet and helps identify the subnet's endpoints. Allowing for header length, 162 routes can be encoded in a single packet message segment given an MTU of 1500 bytes (typical of Ethernet and Point to Point Protocol links). Route data fields may be padded with zeros at the start of a segment with segment number greater than one so that they commence on a 32-bit boundary; this is to ensure the correct computation of the checksum, and the padding is ignored for checksum purposes.

In order to make a decision to forward an IP packet message segment to a destination, a router matches the destination with a route in its routing table having the most specific match: here the most specific match is the route with the longest matching prefix and subnet-mask combination. In this regard matches between destinations are normally partial, and the most specific match corresponds to the greatest number of sequential matching digits. For example, four smaller subnets indicated by the following four networks:

192.168.0.0/24,
192.168.1.0/24,
192.168.2.0/24, and
192.168.3.0/24

This can be simply referred to as a larger network: 192.168.0.0/22

This is also an example of route summarisation described below, i.e. for the situation where routes to the four smaller subnets are all behind (i.e. reachable by way of) one particular router. Therefore any of the four smaller subnets forms part of and will match the larger network.

Route summarisation is a feature of OSPF which is operative at borders of areas (subnets) and Autonomous Systems (AS): the summarisation feature combines multiple routes into a single route to one router, via which messages for different destinations then pass. The Routing Bridge software mimics this feature as follows: a subnet (e.g. SN in FIG. 4) of modified OSPF routers (e.g. MR7 to MR9) may lie on one and only one of two or more selectable summarised routes between the same two conventional OSPF routers such as R1 and R4. If so, different summarised routes having identical starts and destinations can be compared in order to choose the more desirable route indicated by a better route metric. If this were not done, then a danger would arise that a highly specific route advertised by a modified OSPF router would defeat a summary route advertised by a conventional OSPF router, even if the summary route had a lower route metric: here a specific route is a unique route, one that can not be summarised.

Although Routing Bridge software is used to implement sending and receiving using multicast UDP, multicast is one of the routing schemes that routers running Routing Bridge software do not advertise in routing messages they send. Routes not advertised are referred to as 'blocked routes'. Advertisement and processing of blocked routes by a modified OSPF router prior to passing a message out of the subnet SN to one of the conventional OSPF routers R1 to R6 could cause routing loops or instability in the network N. Blocked routes include:

(a) multicast routes and broadcast routes;
(b) experimental destinations (224.0.0.0/3)—those not in normal use;
(c) loop-back routes (127.0.0.0/8)—a router's loopback address which would result in messages being sent to itself;
(d) un-configured addresses (0.0.0.0/8); and
(e) zero-configured addresses (169.254.0.0/16).

Figure 6:
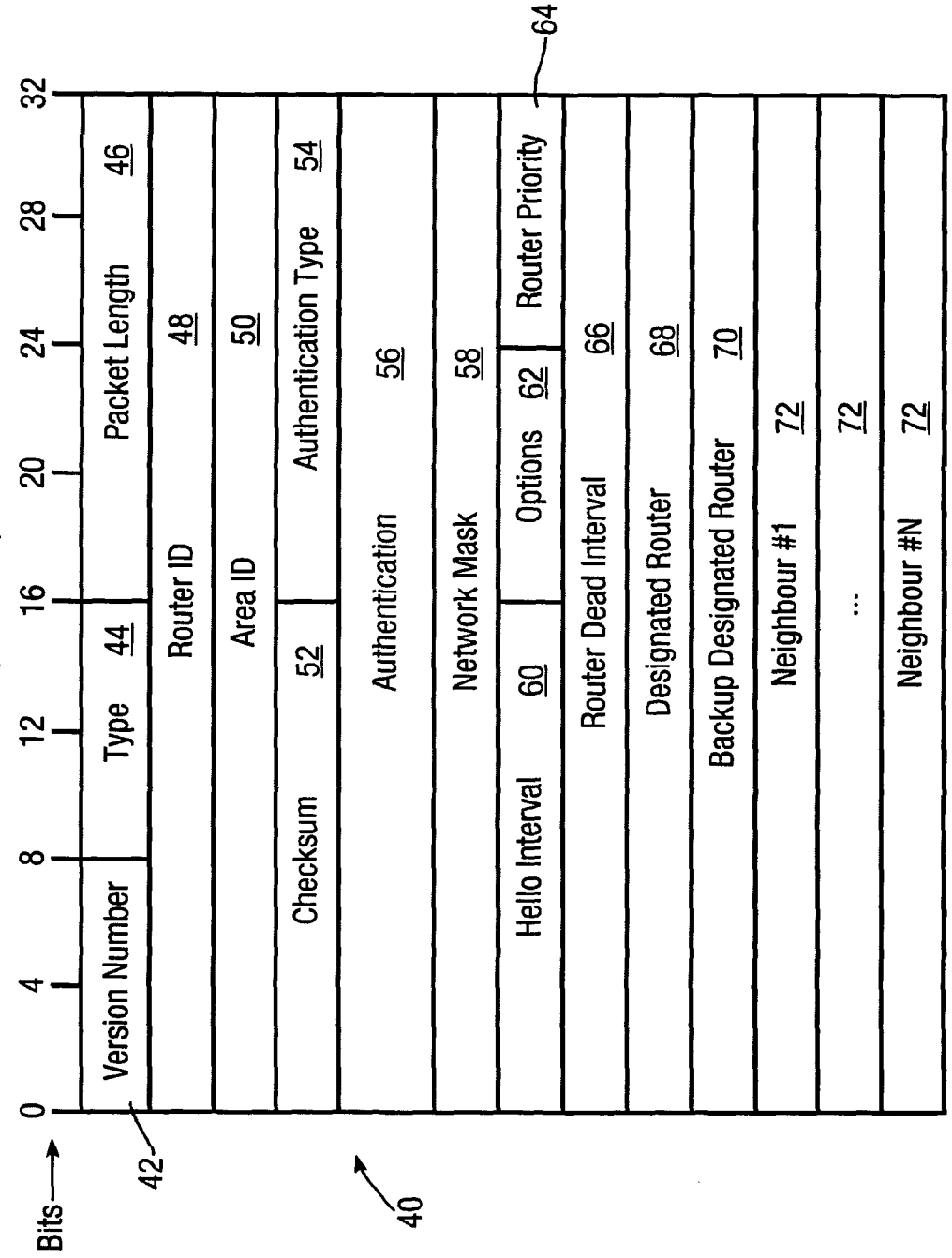
FIG. 6 shows a second message format for a conventional (prior art) OSPF message segment header.

A conventional OSPF message segment header format 40 is shown in FIG. 6 for comparison with FIG. 5. The format 40 has a 32-bit header indicated by a scale at the top of the drawing and consisting of three fields, OSPF version number 42 (8 bits), message type 44 (8 bits) and message packet length 46 (16 bits). These are followed by:

(a) Router ID (identity) 48 (32 bits);
(b) Area ID 50 (32 bits);
(c) Checksum 52 (16 bits);
(d) Authentication type 54 (16 bits)—to identify a message authentication procedure;
(e) Authentication signature 56 (32 bits);
(f) Network mask 58—indicates available network addresses (32 bits);
(g) Hello interval 60—time between Hello messages (16 bits);
(h) Message options 62 (8 bits);
(i) Router priority 64 (16 bits);
(j) Router dead interval 66—time after which a non-responding router is considered to be no longer linked and the associated route to it is to be deleted (32 bits);
(k) Designated router address 68 (32 bits);
(l) Backup designated router address 70 (32 bits); and
(m) Neighbouring or adjacent OSPF router addresses 72 (32 bits), i.e. addresses indicated by #1 to #N, where N is a positive integer: the OSPF cost figure is subsumed in this.

Comparison of FIGS. 5 and 6 shows that, compared to OSPF, modified routers implementing the Routing Bridge use a much simpler or more lightweight message format with far fewer bits requiring less bandwidth. This is an important advantage when using a limited link with low bandwidth. The OSPF header has 320+32M bits, where M is the number of neighbours. The Routing Bridge header has 64+72N bits, where N is the number of routes (maximum 162). In particular, unlike conventional OSPF, there is no designated router or backup designated router to cause network service failure. Moreover, the Routing Bridge does not use a handshaking routine involving exchange of hello messages to enable a modified router to become a new member of a network or subnet of modified routers, because a modified router is not required to identify message recipients (unlike conventional OSPF once more). Modified routers implementing the Routing Bridge send out multicast messages, so that any communications system connected to a link over which such a message is sent can receive that message. Consequently there is no need for a Hello Interval or a Router Dead Interval.

A modified OSPF router uses an algorithm implemented by the Routing Bridge software in order to maintain a routing table, send routing messages to one or more peers across limited links and react to incoming messages received by the router. The algorithm has three sections or procedures: Maintain (i.e. maintain routing table), Send Message and Receive Message. The Maintain and Send Message sections in combination are a server side application. The Receive Message section is a client side application. Consequently, the Routing Bridge software implements both server side and client side applications. The separation of the Receive Message section from the Maintain and Send Message sections accommodates asynchronous receipt of messages, which occurs at unpredictable times.

Figure 7:
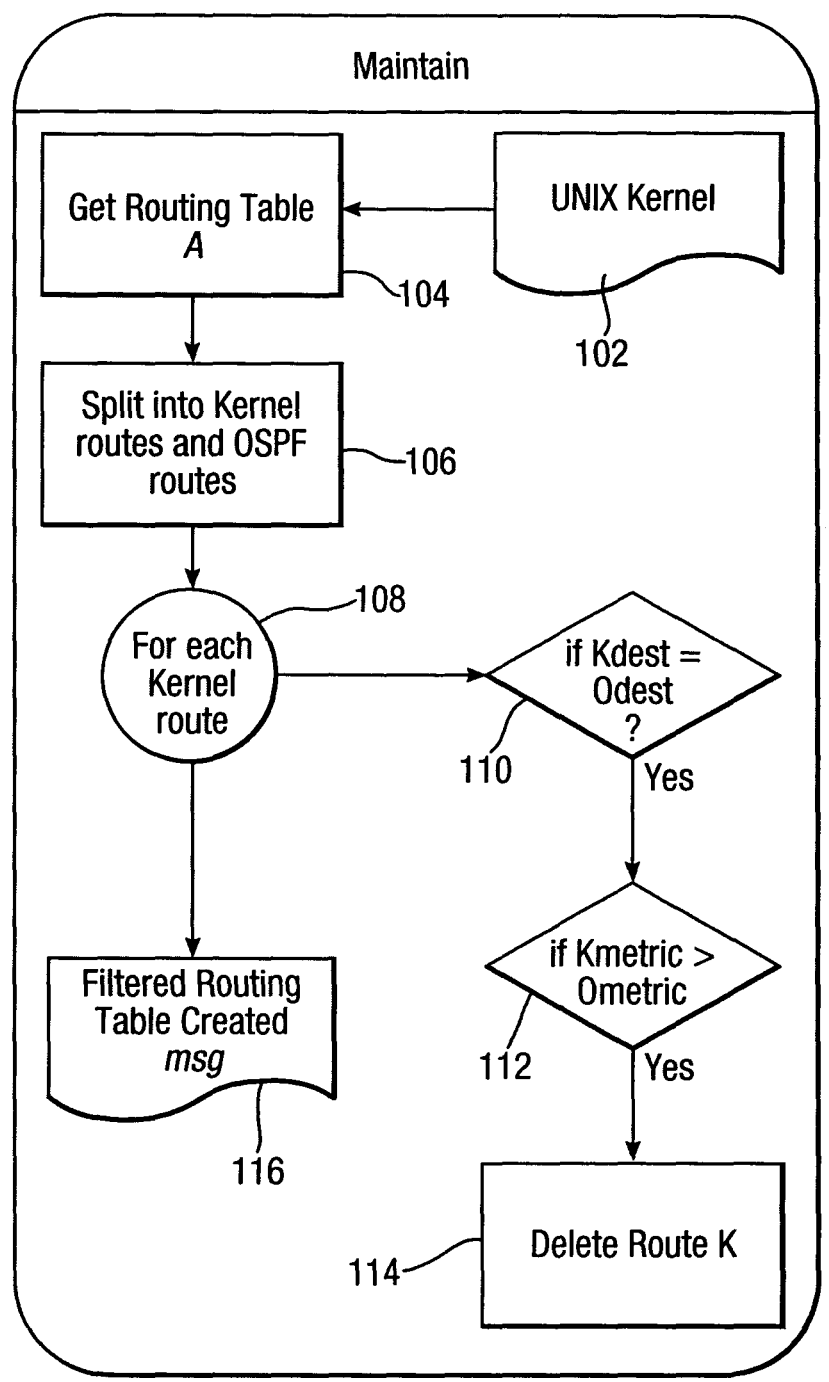
FIG. 7 is a flow diagram of a Maintain procedure for maintaining a routing table in a modified OSPF router.

Referring now to FIG. 7, a Maintain procedure for maintaining a routing table in a modified OSPF router in one embodiment of the invention, and this procedure is indicated generally by 100. The router has an operating system with a UNIX Kernel 102 which retains a full local routing table. At 104, the routing table is read out of the kernel 102 and designated as table A; at 106 table A is divided into (1) Kernel routes—defined as routes to other modified OSPF routers running the Routing Bridge software, and (2) OSPF routes—defined as routes to conventional OSPF routers. Kernel route destinations and OSPF route destinations and their route metrics have numbers indicated by prefixes K and O respectively in the drawing.

At 108, Kernel routes are selected in sequence, and the destination Kdest of each Kernel route is compared to the destination Odest of each OSPF route in turn at 110. If Kdest is equal to Odest, i.e. if a Kernel route has the same destination as an OSPF route, then at 112 route metrics Kmetric and Ometric of the Kernel route and OSPF route are compared. If Kmetric is greater than Ometric, Kernel route number K is deleted from Table A at 114. After all the Kernel routes have been assessed in this way, the result is a filtered routing table A at 116 which is used as the basis for a routing message msg. The filtered routing table A is then discarded after updating the local routing table held by the UNIX Kernel. When another routing message msg is to be sent the Maintain procedure is run again.

The Maintain procedure deletes routes listed in the local routing table to form the filtered routing table A if the routes are Kernel routes with inferior route metrics to OSPF routes with the same destinations. This is necessary because of the way in which routes are added to the local routing table maintained by the UNIX Kernel 102. As previously mentioned, a modified OSPF router (like a conventional OSPF router) maintains its local routing table from information in routing messages regarding new or better routes. Routes added in this way are considered to be static (Kernel) routes which override OSPF learned routes, even if the OSPF routes happen to have a better route metric. If a better OSPF route appears to a specific destination via a link which does not involve the Routing Bridge, but there is also a Kernel route with an inferior route metric, then the Kernel route must be withdrawn to enable the better OSPF route to be implemented. The better OSPF route will automatically be inserted into the local routing table once the Kernel route is removed: this is carried out by conventional OSPF software communicating with the local UNIX Kernel 102.

Figure 8:
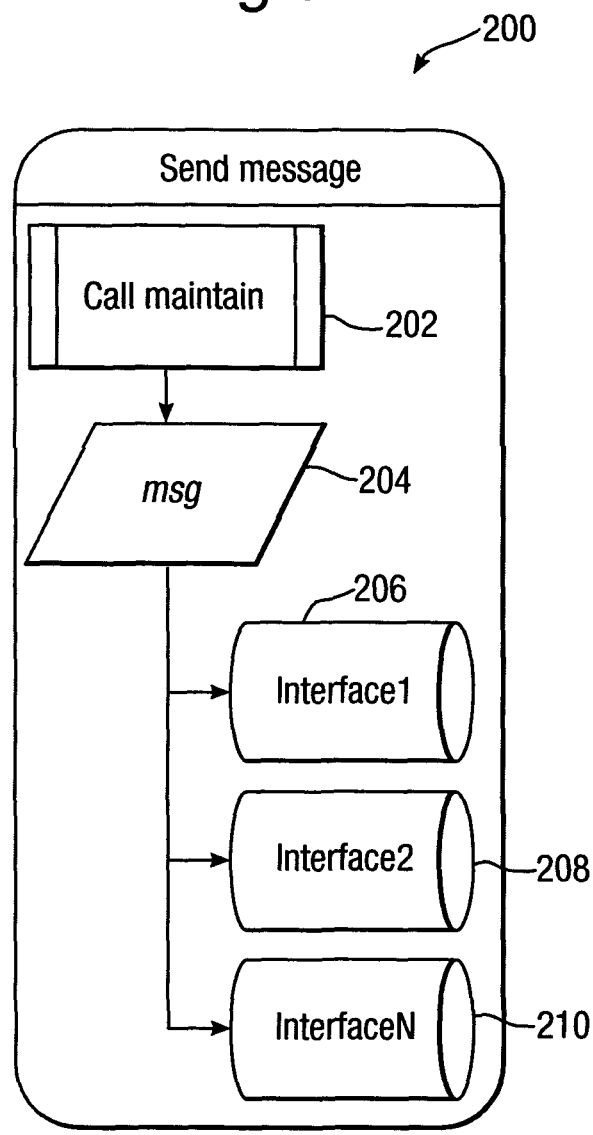
FIG. 8 is a flow diagram of a Send Message procedure for a modified OSPF router.

FIG. 8 is a flow diagram of a Send Message procedure for a modified OSPF router in one embodiment of the invention, and this procedure is indicated generally by 200. Before sending a message, at 202 the router runs the Maintain procedure 100 to generate an up-to-date filtered routing table A for a routing message msg 204. It then sends the routing message msg 204 to all interfaces 206 to 210 that are currently active: an interface is active if (a) the Routing Bridge is to operate using it and (b) it has at least one peer currently live, i.e. another router available to receive a message via the interface. This results in a multicast message being sent out of each of the interfaces 206 to 210 containing all routes which are installed in the main Kernel routing table at 102 except those:
 (a) whose output interface is an interface of the router sending the message (this is referred to in the art as "split horizon": it avoids messages looping back to the sender);
 (b) that match a summary route, in which case the summary route is sent once per message; or
 (c) that match entries on the blocked routes list.

The specific identity of the live peer is not important and need not be the same for consecutive messages. The Send Message procedure 200 implements the split-horizon mechanism, i.e. refusing to advertise routes passing back to the sender via the same link used by the outgoing message: it also suppresses obviously uninteresting routes such as broadcast addresses and causes route summarisation to match that in conventional OSPF.

Figure 9:
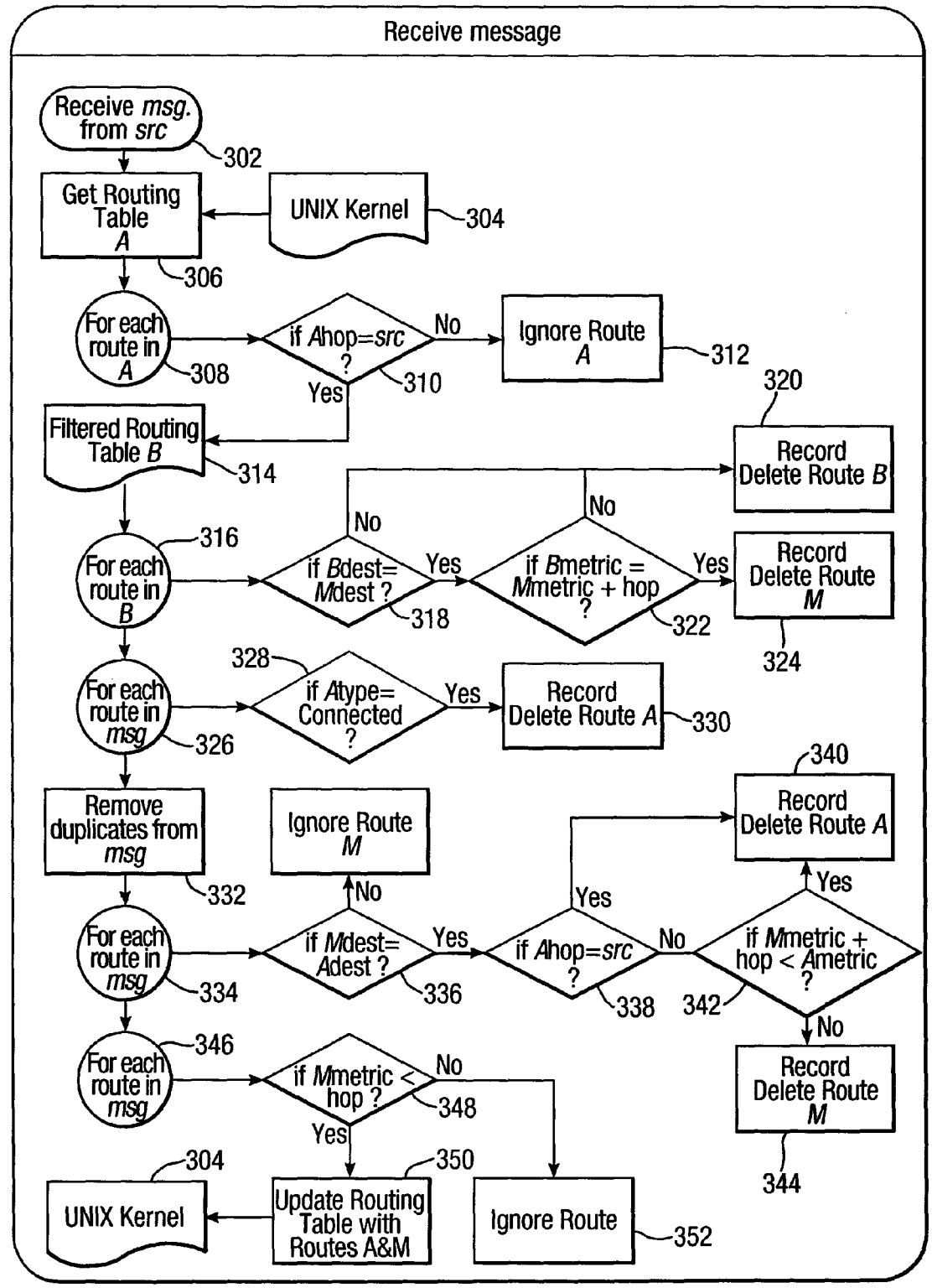
FIG. 9 is a flow diagram of a Receive Message procedure for implementation by a modified OSPF router.

FIG. 9 is a flow diagram of a Receive Message procedure indicated generally by 300 implemented by a modified OSPF router in one embodiment of the invention. The Receive Message procedure 300 is used to update a local routing table in the router's UNIX Kernel: it operates in response to receipt of a message msg at 302 from a sending peer (e.g. another router, not shown) or source with an IP address src. The message msg concerns routes and may contain new or better routes compared to those currently in the local routing table.

The modified OSPF router reads its full local routing table from its UNIX Kernel 304 and records it as routing table A at 306. At 308, each route in routing table A is selected in sequence in order to produce a filtered table designated table B: in the drawing the expression Route A is shorthand for a currently selected route in table A; Route A's next-hop Ahop is compared with the sending peer's IP address src at 310: here a next-hop is a link to a message sending or message receiving peer linked directly to the recipient or sender respectively, i.e. without intervening peers (e.g. routers R1 and MR8 or R1 and R2 in FIG. 4). If Route A's next-hop is not equal to src, Route A is ignored (left unaffected) at 312; if Route A's next-hop is equal to src, this route is recorded at 314 by adding it to table B. Steps 308 to 312 are iterated for all routes in routing table A, so that the routes accumulated in filtered table B are only those whose next-hop is src indicating that they are routes to peers linked directly to the message sending peer.

At 316 each route in filtered table B is selected in sequence, Route B being a currently selected route in table B with destination Bdest and route metric Bmetric. Bdest is compared at 318 with each route destination in the message msg in turn, a currently compared message route being Route M with a destination Mdest and route metric Mmetric: if Bdest is not equal to any Mdest—i.e. if Bdest does not appear as a destination in the message, then Route B is recorded for deletion at 320: here the expression "recorded for deletion" means "added to an accumulating list of routes for deletion later"; the reason for this is that it is simpler and more efficient to update the local routing table in the UNIX Kernel 304 once in response to a message msg. Consequently, routes to be deleted, inserted or altered are recorded until routes have been fully assessed and then updating is implemented.

If Bdest is in fact equal to any message destination Mdest, i.e. if Bdest does appear in the message msg, then at 322 its route metric Bmetric is compared to Mmetric, route metric of Route M. If Bmetric is not equal to Mmetric plus a hop metric, then Route B is deleted at 320: here the relevant hop metric is that of the hop or link from the message sender at src to the receiving router, and will be termed the S/R hop metric. The comparison of Bmetric with Mmetric plus the S/R hop metric is because the requirement is to retain routes relating to peers other than the message recipient running the procedure 300, and which can be reached via the message sending peer at src. The hop between the message sending and receiving peers is therefore added to that of the hop(s) between the message sending peer and a peer reachable via Route M. In the drawing, to simplify labelling, the expression "hop" is used for the "S/R hop metric" (three occurrences).

If Bmetric is in fact equal to Mmetric plus the S/R hop metric, then Route M is recorded for deletion at 324. Steps 316 to 322 or 324 as appropriate are iterated for all routes in table B. This results in Kernel routes in table B being recorded for deletion if they are either not in the message msg or do not have a route metric equal to the sum of the S/R hop metric with the metric of a route in the message msg with the same destination. This removes old routes, i.e. routes no longer advertised by the peer from which the message msg was received; it also removes routes that have changed.

Defensive checks are made to ensure that message packets are not re-routed to a local destination and that a peer only advertises active routes in its table. At 326, each route in the message msg is selected in sequence, and the route's destination in routing table A is checked at 328 to see whether or not it is marked as directly connected: if it is so marked it is recorded for deletion at 330. Duplicate routes are removed from the message msg at 332, with a route with a lower or lowest metric being retained of two or more routes with the same destination differing in metric. A check for duplicate routes should not in theory be needed because a peer will not advertise the same route twice (due to route summarising etc), but it is made as a defensive check and safeguard.

At 334, each route in the message msg is selected in sequence, an individual message route being Route M with a destination Mdest once more; Mdest is checked at 336 against all destinations of routes in the routing table A in turn, a currently compared table A route being Route A with a destination Adest. This check is to determine whether or not Route M is a route to the same destination as any route in table A. If Mdest=Adest at 336, at 338 the next-hop Ahop of Route A is compared with the sending peer's IP address src. If Ahop is equal to src at 338, then Route A passes to or via the sending peer directly and is recorded for deletion at 340.

If Ahop is not equal to src at 338, route metrics Mmetric and Ametric of Route M and Route A respectively are compared at 342. If Mmetric plus the S/R hop metric is less than Ametric, then Route A is recorded for deletion from the message msg at 340. If Mmetric plus the S/R hop metric is not less than Ametric, then Route M is recorded for deletion at 344. Steps 334 to 342 or 344 as appropriate are iterated for all routes in the message msg. The outcome of this is that, if table A contains a route—Route A—to the same destination as a route—Route M—in the message msg but via another peer over the same link, then Route A is recorded for deletion from the Kernel 304. If alternatively Route A is to the same destination as a route in the message msg but via a different link between modified OSPF routers, then if the message route metric plus the S/R hop metric is better than that of Route A, Route A is recorded for deletion from the Kernel 304; otherwise, i.e. if the message route metric plus the S/R hop metric is not better, the message route—Route M—is recorded for deletion from the message msg.

At 346, each route still remaining (i.e. not recorded for deletion) in the message msg after step 344 is selected in sequence once more. Each of these remaining routes and its route metric Mmetric received in the message msg is compared in turn with entries in table A at 348 to assess whether or not it appears there. Each of these remaining routes which is either not already in table A or which is already in table A with an inferior route metric is recorded at 350 with a next-hop of src and a respective route metric equal to Mmetric plus the S/R hop metric: this sets the route metric to that of a total path between sending peer and destination. Routes for which neither of these criteria apply are ignored (left unaffected) at 352, i.e. routes in the message msg already in table A with an equal or better route metric. An updated local routing table is then constructed at 350 as follows: firstly, all the routes (Routes A and B) recorded for deletion from table B at 320 and table A at 330 or 340 are now deleted from the Kernel's version of local routing table A; secondly all the routes (Route M) in the message msg recorded for deletion at 324 or 344 are then deleted and the remaining message routes are added to the version of the local routing table A from which Routes A and B have been deleted and now held in the Kernel 304 (shown a second time at lower left for convenience of illustration). This completes the local routing table update of the Kernel 304 for the current message msg, and this updated version of the local routing table will be used until another message is received triggering operation of the Receive Message procedure 300.

The procedure of steps 346 to 350 both adds new routes to and replaces inferior routes in the version of local routing table A maintained by the Kernel 304: each of these routes is given a route metric set to that of a respective total path between sending peer and destination. Better routes already in the Kernel 304 (obtained via some other link) are preserved.

The Receive Message procedure 300 results in an update of the local routing table in the Kernel 304 in response to message receipt only. Unlike conventional OSPF, there is no designated router or backup designated router to cause loss of service between network members consisting of modified routers operating the Routing Bridge. Moreover, the Routing Bridge does not use hello messages. Messages are sent to any modified router connected to a link over which the message passes. Consequently, unlike OSPF, there is no handshaking routine involving exchange of hello messages to enable a modified router to become a new member of a modified router network or subnet. This also results in lower bandwidth requirements for the Routing Bridge.

A further embodiment of the invention will now be described. It has parts largely in common with the earlier embodiment described with reference to FIGS. 1 to 9, so description will concentrate on aspects of difference. In this embodiment the Routing Bridge software has three parts directed respectively to configuration of a communications system; sending of messages and receiving of messages, as follows:

Configuration: a single file is used to configure multiple operating interfaces as well as networks and routes to be ignored when advertising, e.g. specific networks that can be ignored because users do not require access to them and do not wish them to be advertised. The Configuration file does not store dynamic data; instead it is written once by a user and referenced but not edited by software later: it is parsed when the Routing Bridge software begins to run and is stored in the library so that it can be referenced when needed.

Sending: message sending software is used to construct a routing message based on a local routing table: the message is sent out over all operating interfaces and maintains the local routing table to ensure optimum routes are always available.

Receiving: message receiving software retrieves a routing message received from a source in the form of a remote communications system and installs appropriate routes from that message to ensure that the local routing table has all possible routes to remote networks.

In this embodiment of the invention, compared to the embodiment described earlier changes have been made which in brief are as follows, i.e. this embodiment:

(a) implements system configuration with a single configuration file;
(b) provides a library for common sending and receiving functions and routing table storage; the library is available to both sending and receiving software of the Routing Bridge. This economises on software as it avoids having functions replicated in sending and receiving software. Routing table caches and configuration information are stored in the library. Routing Bridge sending or receiving software makes a call to the library with the configuration file location on the Routing Bridge hard disc; the library parses the configuration file and passes it back whenever required. This avoids both sending and receiving software having to parse the configuration file:
(c) configures multiple operating interfaces with individual parameters;
(d) uses multiple message types (three in total);
(e) copes with local and remote operating interface shutdown (Linux command ifdown);
(f) copes with local and remote operating interfaces changing their IP addresses;
(g) has the ability to remove routes from an individual source;
(h) provides logging for errors, warnings and information messages;
(i) provides statistic logging for sender and for receiver
(j) has up to 144 routes per message packet, with ability to split messages across multiple packets;
(k) utilises vtysh output rather than telnet (for access to zebra daemon routing table): vtysh is an integrated shell for the Quagga Routing Suite and simplifies local connection to the zebra routing daemon;
(l) can deal with interfaces in differing networks on Point-to-Point Protocol (PPP) links;
(m) only sends and receives via an operating interface if that interface has UP and RUNNING flags which are read by this embodiment and which are appropriately set;
(n) has ability for time-out of interfaces and sources: a source is the address of a remote sender of a message, and time-out is a time interval after which interfaces and sources will be deleted from a routing table;
(o) has maintenance functionality to provide for a kernel routing table to have optimum routes installed only; and
(p) marks interfaces/sources as ACTIVE, CLOSED, or EMCON when necessary: ACTIVE means operative, CLOSED means non-operative, and EMCON means operative in receive mode but not transmit mode.

In this embodiment of the invention, the Routing Bridge provides a relatively simple configuration file. For each interface over which routers running the Routing Bridge software are to operate, three pieces of information are required as follows:

(1) Interface: identity of the interface;
(2) Metric: a metric associated with traffic traversing a link to the interface; and
(3) Time-out: a time-out value for the sources of the interface, i.e. a time interval after which they will be deleted.

The Routing Bridge also has a list of any networks and routes which are to be ignored, an example being given below (remarks in italics and parentheses are explanatory and not part of the file).

```
/********************** FILE ********************/
    (interface address)
        tap0:250:40
    (destination addresses to be ignored)
        ignore:127.0.0.0/8
        ignore:224.0.0.0/3
        ignore:169.254.0.0/16
/******************** END FILE *****************/
```

The configuration file lists the identity of each interface (configured interface) over which this embodiment of a communications system is configured to operate. Each configured interface identity requires a new line, but there is no limit to the number of interfaces. If the Routing Bridge software cannot find or access a configured interface, that interface will be ignored until it becomes usable at which point it will be marked in the configuration file as ready for message sending or receipt.

The configuration file accommodates multiple interface identities and networks and routes to be ignored, but the sending and receiving applications embodied in the Routing Bridge software also take global routing bridge arguments or parameters, such as:

(a) Configuration file: physical location of this file on computer hard drive;
(b) Interval value: time interval between sending messages per interface; and
(c) Multiplier value: how many messages to send before updating route cache.

Controlling scripts are provided to ensure that software is always running on a communications system with Routing Bridge software installed, so that the system will start automatically when switched on. This is done with the use of a control script (called rb-control) and a boot script (called rb-use) which runs the control script. The control script stores the global arguments or parameters referred to above to pass on to the Routing Bridge software. The rb-control script logs its information to a UNIX log file designated /var/log/messages with simple text output which logs start/stop times of the router running Routing Bridge software.

Figure 10:
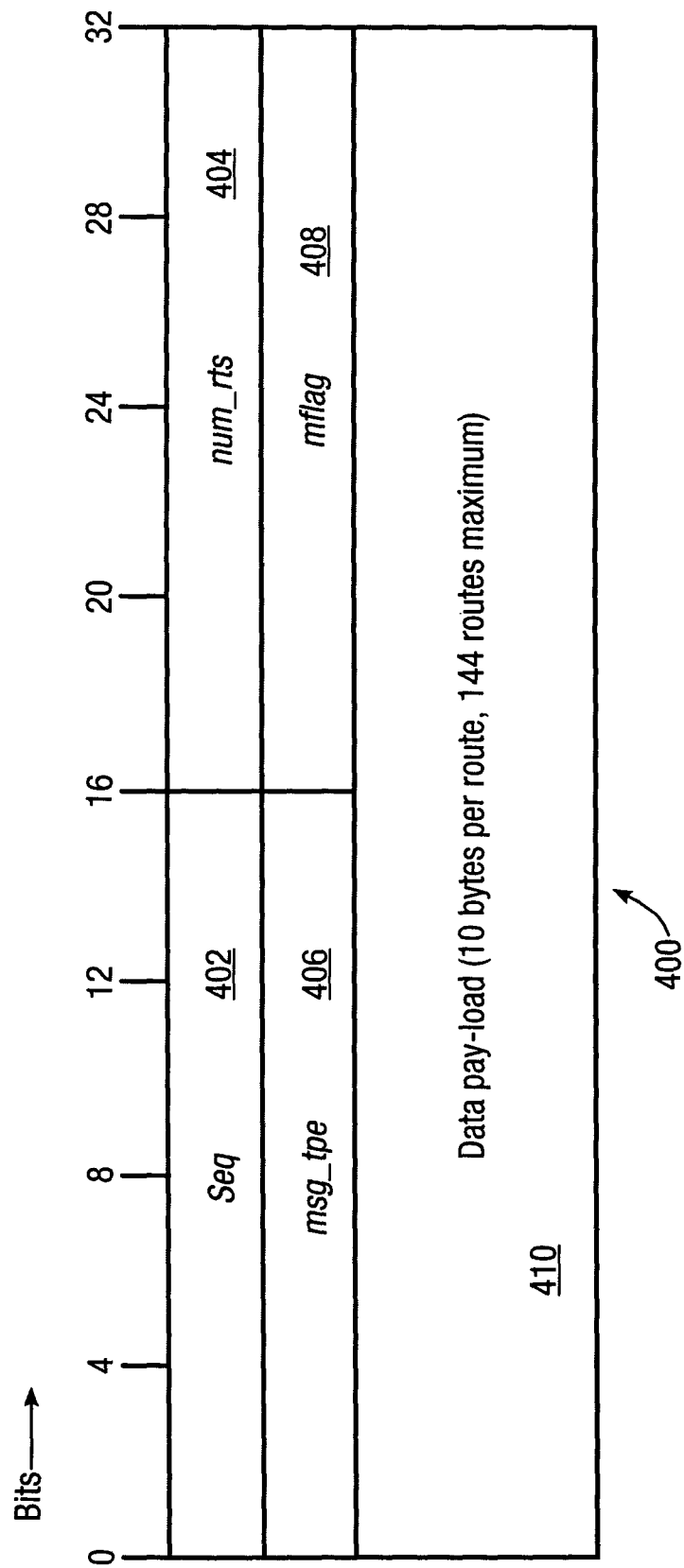
FIG. 10 shows a third message format for a message segment header used in a further embodiment of the invention.

Referring now to FIG. 10, in this embodiment of the invention, the Routing Bridge implements a message format indicated generally by 400. The format 400 begins with a sequence number "seq" 402 16 bits long indicating message packet location in a message consisting of multiple packets; "seq" is followed by another 16 bit number "num-rts" 404 indicating the number of routes over which the message packet is to be sent. There is then a 16 bit message type indicator "msg-type" 406 indicating to which of three possible message types the packet relates. A message flag "mflag" 408 is provided which is 0 for a final message packet and 1 for all other packets in a message. Finally there is a data pay-load identifying routes, 10 bytes per route and 144 routes maximum.

The Routing Bridge software gives a router the ability to construct routing messages and send them out of configured interfaces; in addition a maintain section is associated with message sending arrangements. The maintain section is to ensure that no kernel route (installed by means of the Routing Bridge) is being utilised if there is a zebra route to the same destination with a lower metric. So in this embodiment the maintain section has a maintain function with access to a local zebra routing table (zebra table) as well as to a local routing table (kernel table) in the UNIX Kernel (compare UNIX Kernel 102). Software associated with message receipt only has access to the kernel table to check for best installed routes. The kernel table consists of installed kernel routes and the zebra table consists of zebra learnt routes. The expressions 'installed route' and 'learnt route' have the following meanings: zebra routing protocols pass around routes which are called 'learnt' routes; a route which has been learnt from a remote router can become installed if there is no other route with a cheaper metric. Any route in the kernel table is an installed route, and routes within the zebra table are a combination of installed routes (representation of the kernel table) and routes which have been learnt: but an already installed route has a better metric, unless it is a newly learnt route which might become installed if no other route with a better metric covers an associated subnet.

A pseudo code extract appears below, in which the maintain function is passed to the kernel table as "lrts" and to the zebra table as "zrts". in this and other pseudo code extracts a convention is used that an inset of a line to the right following "{" on the preceding line indicates an iterative loop including the line and those following it of equal and greater inset; the loop terminates when a line of lesser inset is reached which begins with "}". The maintain function compares each installed kernel route in Iris with all other installed kernel routes in lrts and all zebra learnt routes in zrts to ensure that only one optimal route to that destination exists installed in the kernel routing table.

```
maintain(lrts, zrts) {
    for l in lrts:
        if((l.isSelected == True) AND (l.proto == 100)) {
            for k in lrts:
                if((l.dest == k.dest) AND (l.metric > k.metric))
                    delete(l)
            for z in zrts:
                if((l.dest == z.dest) AND (l.metric > z.metric))
                    delete(l)
        }
}
```

As has been mentioned, the Routing Bridge software has global arguments or parameters one of which is the multiplier value, which indicates how many messages to send before updating tables: the Routing Bridge message sending software runs the maintain function every time the multiplier value is exceeded, and then it creates a list of routes to be advertised over a set of configured interfaces identified in the configuration file. Each complete routing message is constructed for each configured interface, to avoid routes over the active interface being advertised over the same interface; this solves the split-horizon issue described earlier, i.e. creating a routing loop. Another pseudo code extract appears below: it relates to constructing a routing message. In this extract, 'table' is a kernel table and 'sock' is a file descriptor for an opened socket on an active configured interface, i.e. a Network interface socket for sending and receiving packets. When the number of routes in a message packet equals the maximum prescribed by the interfaces' Maximum Transmission Unit (MTU) value, the Routing Bridge message sending software will send that packet with a message format "mflag" 408 set to 1, which informs a receiver of the packet that more packets are to come to complete a message. When the Routing Bridge message sending software is ready to send the final packet of a message, the packet header's "mflag" will be set to 0.

```
while(sender==1) {
    for rt in table:
        if((sock.iface != rt.iface) AND (rt.isSelected == True))
            send_list.add(rt)
        num_rts++
        if(num_rts > MAX_RTS)
            packet = make_packet(header, send_list)
            sendto(sock.fd, destination, packet)
}
```

The Routing Bridge message sending software also has the following functions, i.e. it:

(a) links to a lock file, this being an empty file which stops execution of the Routing Bridge message sending software if the file already exists when execution starts; consequently only one sending software application can run on the same communications system computer at a time. The lock file is located at /tmp/rb-snd.lck on the hard disc using the UNIX system.

(b) creates a log file, this being a file where information; warning and error messages are stored/logged for information, warning and error messages as they occur; in this embodiment the log file has a physical location /var/log/rb/snd-events.log on computer hard disc.

(c) creates a statistics file, this being a file which stores statistical information, e.g. what interfaces are in use; number of message sent/received, current timeout values on interfaces/sources; in this embodiment the log file has a physical location: /var/run/rb/snd-stats.log on computer hard disc.

The Routing Bridge software implements a receiving procedure which is asynchronous, as it is not possible to predict time of receipt of an incoming message from a remote source. The Routing Bridge only listens on the configured socket for one second at a time and then only if the interface has its UP and RUNNING flags set (if the RUNNING flag is unsupported by the network interface then it is assumed to be RUNNING if it has its UP flag set).

The Routing Bridge receiving software logs an error for a received IP message packet with an IP packet size less than zero; if the IP packet size is equal to zero, the receiving software increases an interface time-out count, and if the IP packet size is greater than zero, the receiving software treats the IP message packet as received Routing Bridge data. Due to the multicast operation of the Routing Bridge, the receiving software requires to establish whether or not the received Routing Bridge data was intended for the current recipient: it establishes this by checking for a point-to-point flag at the interface via which the message packet was received. if either the interface is using Point-to-Point Protocol (PPP) or alternatively if it cannot be determined whether or not the interface is using PPP, then the receiving software processes the message packet in a normal way (described later); otherwise, if the interface is not using PPP, the receiving software processes the packet as normal if and only if the packet has a source address in the same network as the configured interface via which the packet was received.

To process a recently received packet, the first step of the receiving software is to unpack the Routing Bridge message header 400 from the packet. The message type data msg_type

406 within the header will inform the receiving software which form of processing to implement. There are three message types:

IPC IP address change of a Routing Bridge on a remote communications system;

RTS route message with up to 144 routes per packet;

SHT shutdown of a Routing Bridge on a remote communications system;

During certain procedures it may be appropriate to 'flush' or remove a large set of routes from a local kernel routing table: this is because the receiving software has registered the fact that a remote bridge has been shutdown or that a remote IP address has altered: this is implemented by a function called "flush route table", which can remove:

(a) all Routing Bridge routes;

(b) all Routing Bridge routes available over a specific interface; or (c) all Routing Bridge routes from a specific Routing Bridge on a remote communications system.

Routing Bridge receiving software receives route messages (msg_type=RTS at 406) from respective Routing Bridge source addresses of remote communications systems. Once it has received all packets of such a message (mflag=0 on final packet) the following steps are taken to ensure only the appropriate routes are installed into the kernel routing table:

(1) install any new/unknown routes advertised in the message;

(2) remove any routes not advertised in the message;

(3) remove routes with higher metric value than a route to a like destination advertised in the message; and (4) if route and metric are equal, prefer a route already installed.

Similarly to the Routing Bridge message sending software described above, the Routing Bridge message receiving software is also associated with a lock file, a log file and a statistics file has the following functions, i.e. it:

(a) links to a lock file to ensure only one receiving software application can run on one communications system computer at a time, hard disc location: /tmp/rb-rec.lck;

(b) creates a log file for information, warning and error messages, hard disc location: /var/log/rb/rec-events.log; and (c) creates a statistics file for current operating details, hard disc location: /var/run/rb/rec-stats.log.

The invention operates on the network layer: it sends and receives user datagram protocol (UDP) IP packets. This makes the Routing Bridge "protocol agnostic": i.e. it does not rely on any one protocol, and has the ability to link (or bridge) differing protocols together to build up an IP network. For example, two different protocols can be linked by the Routing Bridge over a limited link, and messages can pass through to a third protocol which is different again. Here the protocols may be RIP, OSPF, and/or BGP. There is no straightforward way for directly linking two different protocols both working on the link layer such as U.S. Pat. No. 5,412,654 and RIP. In the embodiments of the invention described above, the Routing Bridge sends routes as opposed to neighbour information. They also disseminate routes at prearranged intervals (every 20 seconds by default, but configurable to change this value); RIP requests the routing table periodically. Embodiments of the invention also use summation of metrics of hops as the basis for selecting best routes, instead of number of hops only. This enables a hop over a high-speed, reliable link to be distinguished from a hop over a less reliable limited link with low bandwidth and/or high latency. Moreover, embodiments of the invention have capability for operation over Point-to-Point Protocol links, and do not require both ends of a message route to be within the same network.

The invention claimed is:

1. A communications system for communicating over limited links, the limited links exhibiting at least one of (i) a bandwidth in a range 2 kilobits/sec. to 40 kilobits/sec. and (ii) a round trip time in excess of 2 seconds, the communications system being arranged to implement communications at network layer and incorporating a configured Open Shortest Path First router which:

a) is configured to route a message without a handshaking hello routine to any like-configured router connected to any limited link over which the message passes, and b) wherein said message has a message format which includes routing information but does not comprise a designated router or a backup designated router.

2. The communications system according to claim 1 wherein the configured Open Shortest Path First router is arranged to:

a) send and receive multicast communications consisting of user datagram protocol (UDP) Internet Protocol (IP) packets, b) maintain respective route metrics for hops in a network over which the communications system operates, and c) derive a preferred communications route to a message recipient as that having hops with hop metrics summing to a total which is superior to that or those associated with a comparison route or routes to that recipient.

3. The communications system according to claim 1 wherein the message format is a first message format, and the configured Open Shortest Path First router is also arranged to:

a) implement a second message format providing handshaking hello information, a designated router and a backup designated router for communication with unconfigured routers implementing the second message format, b) preserve route metric information received from a sending unconfigured router for onward transfer to a receiving unconfigured router, and c) maintain a local routing table containing route information relating to like-configured routers and unconfigured routers, and wherein the configured router is arranged to implement a maintain routing table procedure in which routes to like-configured routers are deleted from the local routing table if they have route metrics which are not superior to those of routes of like destination associated with unconfigured routers.

4. The communications system according to claim 1 wherein the configured Open Shortest Path First router is arranged to implement a send message procedure comprising running the maintain routing table procedure to generate an up-to-date routing table for a routing message and then sending the routing message to communications interfaces leading to like-configured routers.

5. The communications system according to claim 1 wherein the configured Open Shortest Path First router is arranged to:

a) maintain a local routing table containing route information relating to like-configured routers, b) implement a receive message procedure in which routes with inferior route metrics to related routes in an incoming message are deleted from the local routing table, and route information in a received message is inserted into the local routing table if it relates to a route which is either not already in the local routing table or if it has a superior route metric compared to that of a route which is already in the local routing table, and c) exclude from advertising any one or more of routes to an interface of the configured router itself, multicast routes, broadcast routes, experimental destinations not in normal use, loop-back routes, unconfigured addresses, zero-configured addresses and routes that match a summary route.

6. A method for communicating over limited links, the limited links exhibiting at least one of (i) a bandwidth in a range 2 kilobits/sec. to 40 kilobits/sec.and (ii) a round trip time in excess of 2 seconds, the method incorporating communicating at network layer and using a configured Open Shortest Path First router to route a message without a handshaking hello routine to any like-configured router connected to any limited link over which the message passes, the message having a message format which includes routing information but does not comprise a designated router or a backup designated router.

7. The method according to claim 6 including using the configured Open Shortest Path First router to:
 a) send and receive multicast communications consisting of user datagram protocol (UDP) Internet Protocol (IP) packets,
 b) maintain respective route metrics for hops in a network over which the communications system operates, and
 c) derive a preferred communications route to a message recipient as that having hops with hop metrics summing to a total which is superior to that or those associated with a comparison route or routes to that recipient.

8. The method according to claim 6 wherein the message format is a first message format, and the method includes using the configured Open Shortest Path First router to:
 a) implement a second message format providing handshaking hello information, a designated router and a backup designated router for communication with unconfigured routers implementing the second message format,
 b) preserve route metric information received from a sending unconfigured router for onward transfer to a receiving unconfigured router, and
 c) maintain a local routing table containing route information relating to like-configured routers and unconfigured routers, and wherein the configured router is arranged to implement a maintain routing table procedure in which routes to like-configured routers are deleted from the local routing table if they have route metrics which are not superior to those of routes of like destination associated with unconfigured routers.

9. The method according to claim 8 including a send message procedure comprising running the maintain routing table procedure to generate an up-to-date routing table for a routing message and then sending the routing message to communications interfaces leading to like-configured routers.

10. The method according to claim 6 including using the configured Open Shortest Path First router to:
 a) maintain a local routing table containing route information relating to like-configured routers,
 b) implement a receive message procedure in which routes with inferior route metrics to related routes in an incoming message are deleted from the local routing table, and route information in a received message is inserted into the local routing table if it relates to a route which is either not already in the local routing table or if it has a superior route metric compared to that of a route which is already in the local routing table, and
 c) exclude from advertising any one or more of routes to an interface of the configured router itself, multicast routes, broadcast routes, experimental destinations not in normal use, loop-back routes, unconfigured addresses, zero-configured addresses and routes that match a summary route.

11. A non-transitory computer readable medium encoded with a computer program for use in connection with communications over limited links, the limited links exhibiting at least one of (i) a bandwidth in a range 2 kilobits/sec. to 40 kilobits/sec. and (ii) a round trip time in excess of 2 seconds, the computer program incorporating instructions for implementing communications at network layer and for controlling a configured Open Shortest Path First router to route a message without a handshaking hello routine to any like-configured router connected to any limited link over which the message passes, the message having a message format which includes routing information but does not comprise a designated router or a backup designated router.

12. The non-transitory computer readable medium according to claim 11 wherein the computer program incorporates instructions for controlling the configured Open Shortest Path First router to:
 a) send and receive multicast communications consisting of user datagram protocol (UDP) Internet Protocol (IP) packets,
 b) maintain respective route metrics for hops in a network over which the communications system operates, and
 c) derive a preferred communications route to a message recipient as that having hops with hop metrics summing to a total which is superior to that or those associated with a comparison route or routes to that recipient.

13. The non-transitory computer readable medium according to claim 11 wherein the message format is a first message format and the computer program incorporates instructions for controlling the configured Open Shortest Path First router to:
 a) implement a second message format providing handshaking hello information, a designated router and a backup designated router for communication with unconfigured routers implementing the second message format,
 b) preserve route metric information received from a sending unconfigured router for onward transfer to a receiving unconfigured router, and
 c) maintain a local routing table containing route information relating to like-configured routers and unconfigured routers, and wherein the configured router is arranged to implement a maintain routing table procedure in which routes to like-configured routers are deleted from the local routing table if they have route metrics which are not superior to those of routes of like destination associated with unconfigured routers.

14. The non-transitory computer readable medium according to claim 13 wherein the computer program incorporates instructions for controlling the configured Open Shortest Path First router to implement a send message procedure comprising running the maintain routing table procedure to generate an up-to-date routing table for a routing message and then sending the routing message to communications interfaces leading to like-configured routers.

15. The non-transitory computer readable medium according to claim 11 wherein the computer program incorporates instructions for controlling the configured Open Shortest Path First router to:
 a) maintain a local routing table containing route information relating to like-configured routers,
 b) implement a receive message procedure in which routes with inferior route metrics to related routes in an incoming message are deleted from the local routing table, and route information in a received message is inserted into the local routing table if it relates to a route which is either not already in the local routing table or if it has a superior route metric compared to that of a route which is already in the local routing table, and c) exclude from advertising any one or more of routes to an interface of the configured router itself, multicast routes, broadcast routes, experimental destinations not in normal use, loop-back routes, unconfigured addresses, zero-configured addresses and routes that match a summary route.

\* \* \* \* \*